US005300309A

United States Patent [19]

Foguet et al.

[11] Patent Number: 5,300,309

[45] Date of Patent: Apr. 5, 1994

[54] BODY AND MOUTHFEEL POTENTIATED FOOD AND BEVERAGES CONTAINING NEOHESPERIDIN DIHYDROCHALCONE

[75] Inventors: Rafael Foguet; Antonio Cistero, both of Barcelona; Francisco Borrego, Murcia, all of Spain

[73] Assignee: Zoster, S.A., Murcia, Spain

[21] Appl. No.: 33,429

[22] Filed: Mar. 18, 1993

Related U.S. Application Data

[63] Continuation of Ser. No. 841,548, Feb. 26, 1992, abandoned.

[30] Foreign Application Priority Data

Feb. 26, 1991 [EP] European Pat. Off. ........ 91102846.2

[51] Int. Cl.[5] .................. A23L 1/48

[52] U.S. Cl. .................. 426/5.31; 426/548; 426/590

[58] Field of Search .................. 426/548, 531, 590

[56] References Cited

U.S. PATENT DOCUMENTS 3,653,923 4/1972 Ishii et al. .................. 426/548
3,684,529 8/1972 Liggett .
3,695,898 10/1972 Hill et al. .
3,704,138 11/1972 La Via et al. .
3,743,518 7/1973 Eisenstadt et al. .
3,773,526 11/1973 Bliznak .
4,001,453 1/1977 Huber et al. .................. 426/548 X
4,085,232 4/1978 Eisenstadt .
4,087,558 5/1978 Lenke et al. .................. 426/548 X
4,158,068 6/1979 Von Rymon Lipinski et al. .
4,208,431 6/1980 Friello et al. .................. 426/548 X
4,254,155 3/1981 Dwivedi et al. .................. 426/548

FOREIGN PATENT DOCUMENTS 55-46699 11/1980 Japan .
1428945 10/1974 United Kingdom .

OTHER PUBLICATIONS

Gelardi, The Multiple Sweetener Approach and New Sweeteners on the Horizon Food Technology, Jan. 1981, pp. 123–124.
H. Beerens (1981) Ann. Fals. Exp. Chim., 74(796): 261–271.
M. J. Chicouri (1981) Labo-Pharma—Problemes et Techniques, 310:471–474.
Crosby et al. (1980) CRC Handbook of Food Additives, 2:203–216.
DuBois et al. (1981) Journal of Medicinal Chemistry, 24(4): 408–428.
Krbecher et al. (1959) *Journal of Food Science,* 34:101–103.
Guadagni et al. (1974) *Journal of the Science and Food and Agriculture,* 25:1199–1205.
DuBois et al. (1977) *Science,* 1975:397–399.
DuBois et al. (1977) J. Agric. Food Chem., 25(4):763–772.
Schiffman et al. (1979) *Physiology & Behavior,* 23:1–9.
Krbechek et al. (1968) J. Agr. Food Chem., 16(1):108–112.
Schiffman et al. (1985) Pharmacology, Biochemistry & Behavior, 24:429–432.
DuBois et al. (1981) *J. Agric. Food Chem.,* 29(6):1269–1276.
M. G. Lindley (1983) *Applied Science,* pp. 225–246.
J. D. Higginbotham (1983) *Applied Science Publishers Ltd.,* 2:119–155.
A. I. Bakal (1986) Marcel Dekker Inc. pp. 325–346.
A. Salant (1975) Handbook of Food Additives, 2nd Ed., pp. 523–585.
W. M. Nichol (1979) Applied Science, pp. 211–230.
Crosby et al. (1979) *Applied Science Publishers Ltd.,* 1:135–164.

*Primary Examiner*—Joseph Golian
*Attorney, Agent, or Firm*—Birch, Stewart, Kolasch & Birch

[57] ABSTRACT

The invention relates to a body and mouthfeel potentiated foods and beverages containing neohesperidin dihydrochalcone, preferably at a level of 0.1–30 ppm and a process for preparing the same.

5 Claims, No Drawings

BODY AND MOUTHFEEL POTENTIATED FOOD AND BEVERAGES CONTAINING NEOHESPERIDIN DIHYDROCHALCONE

This application is a continuation of application Ser. No. 07/841,548 filed on Feb. 26, 1992, now abandoned.

BACKGROUND OF THE INVENTION

Neohesperidin dihydrochalcone is an intense sweetener which at low concentrations is several hundred times sweeter than sucrose (G. E. Dubois et al., *Journal of Medicinal Chemistry,* 1981, 24, 408-428; G. A. Crosby et al., "New sweeteners" in *CRC Handbook of Food Additives,* T. E. Furia Ed., Boca Raton, Calif., CRC Press, 1980, Vol. 2, 203-216; G. E. Inglett et al., *Journal of Food Science,* 1969, 34, 101-103; D. G. Guadagni et al., *Journal of the Science of Food and Agriculture,* 1974, 25, 1199-1205; G. E. Dubois et al., *Science,* 1977, 195, 397-399; G. E. Dubois et al., *Journal of Agricultural and Food Chemistry,* 1977, 25, 763-772; H. Beerens, *Annales des Falsifications et de l'Expertise Chimique,* 1981, 74, 261-271; M. J. Chicouri, *LaboPharma, Problemes et Techniques,* 1981, 310, 471-474). It has a pleasant, sweet taste and lacks any bitter or metallic aftertaste (S. S. Schiffman et al., *Physiology and Behaviour,* 1979, 23, 1-9).

The relative sweetness of neohesperidin dihydrochalcone, like that of other intense sweeteners, decreases with increasing concentration. Thus, neohesperidin dihydro- chalcone is about 1800 times sweeter than sucrose at or near the threshold of organoleptic perception. As concentration increases, the sweetness of neohesperidin dihydrochalcone decreases relative to that of sucrose. In comparison with a 5% sucrose solution, neohesperidin dihydrochalcone is about 250 times sweeter (D. G. Guadagni et al., Journal of the Science of Food and Agriculture, 1974, 25, 1199-1205). However, in other studies, a higher sweetness of 1000 and 600 times than that of sucrose was reported at sucrose concentrations of 5 and 8.5% respectively (L. Krbechek et al., *Journal of Agricultural Food Chemistry,* 1968, 16, 108-112; G. E. Inglett et al., *Journal of Food Science,* 1969, 34, 101-103, G. E. Dubois et al., *Science,* 1977, 195, 397-399; S. S. Schiffman, *Physiology and Behaviour,* 1979, 23, 1-9).

For the application of neohesperidin dihydrochalcone in certain soft drinks it may be relevant that caffeine enhances the sweetness of neohesperidin dihydrochalcone (S. S. Schiffman et al., *Pharmacology, Biochemistry and Behaviour,* 1986, 24, 425-432).

For the assessment of the organoleptic properties in an intense sweetener, the taste quality and the time/intensity profile are as important characteristics as the mere sweetness potency. The time/intensity profile of neohesperidin dihydrochalcone is characterized by a slightly delayed onset, but a rather long duration of sweetness perception (G. A. Crosby et al., *Developments in Sweeteners,* C. A. M. Hough et al. (Ed), 1, 135-164. Applied Science Publishers Ltd., London, 1979; G. E. Dubois et al., *Journal of Agricultural and Food Chemistry,* 1981, 29, 1269-1276). At higher concentrations, neohesperidin dihydrochalcone was reported to have a lingering menthol-, or licorice-like aftertaste (G. A. Crosby et al., "New Sweeteners" in *CRC Handbook of Food Additives,* T. E. Furia (Ed), Boca Raton, Calif., CRC Press, 1980, Vol. 2, 203-216). However, modifications of the sensory properties of neohesperidin dihydrochalcone are possible by admixture of bulk sweeteners, certain flavors, or other taste modifying food additives such as glutamates, amino acids, or nucleotides (J. D. Higginbotham, "Recent developments in non-nutritive sweeteners," in *Developments in Sweeteners,* T. H. Grenby et al. (Ed), London, Applied Science Publishers Ltd., 1983, 2, 119-155; U.S. Pat. Nos. 4,254,155; 4,085,232; Swiss Patent No. 592418; Japanese Patent No. 80-46699).

When two or more sweeteners are combined, the effective sweetness of the mixture can be different from that found when they are tasted individually. If the sweetness intensity of the mixture is greater than the sum of the sweetness of the components, then the sweeteners are acting synergistically (A. I. Bakal, "Mixed sweetener functionality," in *Alternative Sweeteners,* L. O'Brien et al. (Ed), New York, Marcel Dekker Inc., 325-346, 1986). Neohesperidin dihydrochalcone has been shown to act in this way in mixtures with saccharin (U.S. Pat. No. 3,653,923), saccharin and cyclamate (G. E. Inglett et al., *Journal of Food Science,* 1969, 34, 101-103) and acesulfame-K (U.S. Pat. No. 4,158,068).

SUMMARY OF THE INVENTION

The present invention relates to a food or beverage composition comprising a body and mouthfeel enhancing effective amount of neohesperidin dihydrochalcone. In the context of experiments on the use of neohesperidin dihydrochalcone in foods, it was found surprisingly that with the addition of neohesperidin dihydrochalcone, even at very low levels at which it is no longer perceived as sweet, the body and mouthfeel of various food products could be improved. This effect could be achieved in both sweet or non-sweet foods and beverages. Other non-caloric sweeteners do not have such an effect.

DETAILED DESCRIPTION OF THE INVENTION

The present invention relates therefore to the use of neohesperidin dihydrochalcone not simply as a sweetener, but as an enhancer of body and mouthfeel properties of foods and beverages. So far, such effects could only be obtained either with the addition of bulk sweeteners (e.g. sucrose) at concentrations at which sweetness was also perceived or with non-sweet bulking agents such as maltodextrins (W. M. Nichol, *Sugar, Science and Technology,* 1979, Applied Science, London, p. 227; A. Salant, *Handbook of Food Additives,* 2nd Ed., CRC Press, Ohio, p 533, 1975; U.S. Pat. Nos. 3,684,529; 3,773,526; 3,743,518; 3,695,898; 3,704,138; M. G. Lindley, *Developments in Sweeteners* 2, Applied Science, London, p. 240, 1983).

However, in order to achieve the desired effect, sucrose, maltodextrin and other similar products had to be used at substantial concentrations which added a significant amount of calories to the final product. Using the present invention, it is now possible to obtain an improved body and mouthfeel without adding calories at the same time. This is particularly important for the preparation of low-calorie soft drinks and calorie-reduced confectionery, yogurts, desserts and similar products.

These improved body and mouthfeel properties relate to both the viscosity, consistency, or texture of the composition, and to the fullness and richness of flavor. For example, the claimed compositions impart a thicker, less watery feel in the mouth, improved creaminess and smoothness, and a fuller, cleaner texture. They also impart a general softening and rounding of the flavor profile of the composition, and more enhanced flavor notes. For example, they may add a more spicy flavor note, enhanced chocolate notes, fuller, fruitier flavor notes, enhanced tomato flavor, or enhanced saltiness.

Neohesperidin dihydrochalcone is able to mimic the body and mouthfeel of sucrose in different foods and beverages, even at concentrations as low as 5 ppm or lower, i.e. down to 0.1 ppm. In foods which are sweet and traditionally formulated with sucrose, neohesperidin dihydrochalcone may be used according to the present invention to improve body and mouthfeel in combination with intense sweeteners, which themselves lack such body and mouthfeel enhancing properties. Using neohesperidin dihydrochalcone in this way, product quality can be dramatically enhanced.

For example, when added to a composition containing an artificial sweetener, the composition of the present invention results in a softer, more rounded sweetener profile, with a more sucrose-like sweetness quality. The present invention will also result in reducing the drying aftertaste associated with compositions sweetened with saccharin, and in reducing the lingering sweet aftertaste associated with compositions sweetened with aspartame.

Compositions according to the present invention are prepared by incorporating a body and mouthfeel enhancing effective amount of neohesperidin dihydrochalcone into a food or beverage composition. Preferred compositions comprise said neohesperidin dihydrochalcone at levels of from 0.1 to 30 ppm by weight of the total composition. Particularly preferred are compositions comprising neohesperidin dihydrochalcone at levels of from 0.1 to 5 ppm by weight of the total composition. The level of neohesperidin dihydrochalcone present in the composition may be 0.1 to 4 ppm, more particularly 0.1 to 3 ppm, more particularly 0.1 to 2 ppm, still more particularly 0.1 to 1 ppm, and most particularly 0.1 to 0.5 ppm, all by weight of the total composition. The compositions of the present invention may be in the form of a soft drink, a dessert, a confectionery product, a yogurt, a sauce, a fat, or a tabletop sweetener composition.

Compositions prepared according to the present invention can be used in any conventional manner for using food or beverage compositions.

The present invention is illustrated by the following non-limiting examples. All parts and percentages are by weight of the total composition, unless otherwise indicated.

EXAMPLE 1

Diet Cola

A standard diet cola syrup formulation was developed and sweetened with aspartame. A test formulation was also prepared which was identical to the standard, but contained an additional 1 ppm neohesperidin dihydrochalcone. The benefits of using neohesperidin dihydrochalcone at this level were then assessed by an expert panel of sensory assessors.

| | Formulation (syrup) | |
|---|---|---|
| | Standard % | Neohesperidin dihydrochalcone (1 ppm) % |
| Aspartame | 0.3135 | 0.3135 |
| Sodium benzoate | 0.0620 | 0.0620 |
| Cola flavor FK2350 | 0.4700 | 0.4700 |
| Cola compound AK2050 | 2.2000 | 2.2000 |
| Neohesperidin dihydrochalcone | | 0.00065 |
| Water to | 100 ml | 100 ml |

1 part of each of the above syrups was diluted with 5.5 parts of carbonated water.

Comparisons of the standard and neohesperidin dihydrochalcone containing formulations by expert panel assessment yielded the following:

a. The standard formulation had good quality sweetness, but somewhat thin and watery mouthfeel.
b. The neohesperidin dihydrochalcone formulation had improved mouthfeel and body when compared with the standard. Sweetness quality was perceived as being more sucrose-like. In addition, this formulation had enhanced flavor with more intense spicy notes.

EXAMPLE 2

Diet Tonic Water

A standard low calorie tonic water formulation was developed and sweetened solely with aspartame. A test formulation was also prepared containing 1 ppm neohesperidin. The benefits of using neohesperidin dihydrochalcone were then assessed by an expert sensory panel.

| | Formulation (syrup) | |
|---|---|---|
| | Standard % | Neohesperidin dihydrochalcone (1 ppm) % |
| Sodium benzoate | 0.1000 | 0.1000 |
| Anhydrous citric acid | 2.5000 | 2.5000 |
| Trisodium citrate | 0.3140 | 0.3140 |
| Quinine hydrochloride | 0.0400 | 0.0400 |
| Aspartame | 0.2500 | 0.2500 |
| Neohesperidin dihydrochalcone | | 0.00065 |
| Flavor-tonic water F12790 | 0.9824 | 0.9824 |
| Water to | 100 ml | 100 ml |

1 part of each of the syrups was diluted with 5.5 parts of carbonated water. Comparisons of the standard and neohesperidin dihydrochalcone containing formulations yielded the following consensus opinions:

a. The standard product had good, though somewhat thin and watery sensory quality.
b. The product containing neohesperidin dihydrochalcone had improved mouthfeel, more body, and more sucrose-like sweetness quality. Flavor notes were also enhanced.

EXAMPLE 3

Sugar-Free Chocolate Dessert

A standard sucrose-free chocolate dessert formulation was developed and sweetened with a blend of acesulfame-K and saccharin. A test formulation with 1 ppm neohesperidin dihydrochalcone added was also prepared and the products were compared by an expert sensory panel of assessors.

| | Formulation | |
|---|---|---|
| | Standard % | Neohesperidin dihydrochalcone (1 ppm) % |
| Skimmed milk | 84.8900 | 84.8900 |
| Plain chocolate | 8.2000 | 8.2000 |
| Double cream | 2.1000 | 2.1000 |
| Whipping agent-DP49 | 1.7000 | 1.7000 |
| Purity W (starch) | 1.2000 | 1.2000 |
| Gelatin 240 bloom | 1.2000 | 1.2000 |
| Instant N'Oil | 0.5300 | 0.5300 |
| Salt | 0.1100 | 0.1100 |
| Acesulfame-K | 0.0200 | 0.0200 |
| Saccharin | 0.0080 | 0.0079 |
| Neohesperidin dihydrochalcone | | 0.0001. |

Sensory comparison of these two products yielded the consensus view that the neohesperidin dihydrochalcone containing product had a much improved mouthfeel, enhanced creaminess, enhanced flavor, more chocolate notes, and improved (more sucrose-like) sweetness quality.

The same formulation was also prepared with neohesperidin dihydrochalcone present at supra-threshold levels. A blend of acesulfame-K/neohesperidin dihydrochalcone (0.0180/0.0013%) was found to be equisweet with the acesulfame-K/saccharin product. On sensory comparison of these two products, the acesulfame-K/neohesperidin dihydrochalcone product was found to have an improved sweetness profile, improved mouthfeel, increased smoothness and creaminess, and more body.

EXAMPLE 4

Sugar-Free Lemon Boiled Sweet

A standard sugar-free boiled sweet formulation was developed using isomalt and maltitol syrup as bulk sweeteners with acesulfame-K as the intense sweetener. A test product was also prepared containing an additional 1 ppm neohesperidin dihydrochalcone. These products were then compared by an expert sensory panel.

| | Formulation | |
|---|---|---|
| | Standard % | Neohesperidin dihydrochalcone (1 ppm) % |
| Isomalt | 51.1200 | 51.1200 |
| Maltitol syrup | 47.6000 | 47.6000 |
| Citric acid | 0.8000 | 0.8000 |
| Acesulfame-K | 0.1000 | 0.0999 |
| Color-curcumin | 0.0300 | 0.0300 |
| Flavor- juicy lemon 510781E | 0.2500 | 0.2500 |
| Flavor- NI lemon UKL 434WA | 0.1000 | 0.1000 |
| Neohesperidin dihydrochalcone | | 0.0001 |

Sensory assessment showed the neohesperidin dihydrochalcone containing sample to be of enhanced flavor which was fuller and fruitier; to have a more balanced flavor and sweetness profile; to be more sugar-like; and to have an improved mouthfeel.

EXAMPLE 5

Tomato Ketchup

A standard tomato ketchup formulation was developed and sweetened with a blend of acesulfame-K and aspartame. A test formulation to which had been added neohesperidin dihydrochalcone at 2 ppm was then compared by an expert sensory panel to the standard.

| | Formulation | |
|---|---|---|
| | Standard % | Neohesperidin dihydrochalcone (2 ppm) % |
| Tomato puree | 45.0000 | 45.0000 |
| Water | 32.2800 | 32.2798 |
| Vinegar | 18.0000 | 18.0000 |
| Salt | 3.6000 | 3.6000 |
| Stabilizer | 1.0000 | 1.0000 |
| Flavor | 0.0300 | 0.0300 |
| Acesulfame-K | 0.0500 | 0.0499 |
| Aspartame | 0.0400 | 0.0399 |
| Neohesperidin dihydrochalcone | | 0.0002 |

Sensory assessment by the expert panel showed that the ketchup containing neohesperidin dihydrochalcone had an enhanced tomato flavor, a fuller and rounder flavor, and a smoother mouthfeel, considered to be more like that of a sucrose-containing tomato ketchup.

EXAMPLE 6

Low-Fat Margarine

Standard low-fat margarines were formulated having 40% fat and 30% fat. The test formulations were identical apart from the addition of neohesperidin dihydrochalcone to the aqueous phases. The optimum addition rate of neohesperidin dihydrochalcone to the 40% fat formulation was 3 ppm and to the 30% fat formulation 4 ppm. The benefits of adding neohesperidin dihydrochalcone at these levels were then assessed by an expert sensory panel of assessors.

| | Formulations | | | |
|---|---|---|---|---|
| | Standard | | Test | |
| | 40% fat | 30% fat | 40% fat | 30% fat |
| Fat/Emulsifier | 40 | 30 | 40 | 30 |
| Water/Stabilizer | to 100 | to 100 | to 100 | to 100 |
| Flavor/color (as required) | | | | |
| Neohesperidin dihydrochalcone | — | — | 3 ppm | 4 ppm |

Comparisons of the standard and neohesperidin dihydrochalcone containing formulations by expert panel assessment yielded the following:

Neohesperidin dihydrochalcone formulations had an enhanced flavor impact when compared to a standard product with the same fat content. They had an enhanced saltiness and a cleaner aftertaste. The flavor profile of the samples containing neohesperidin dihydrochalcone were generally perceived as being more rounded and this resulted in the perception of a fuller mouthfeel and texture.

EXAMPLE 7

Savory Sauce

A standard tomato sauce was prepared. A test formulation was prepared which was identical to the standard, but contained an additional 2 ppm neohesperidin dihydrochalcone. The benefits of using neohesperidin dihydrochalcone at this level were then assessed by an expert sensory panel of assessors.

| | Formulation | |
|---|---|---|
| | Standard % | Neohesperidin dihydrochalcone % |
| Tomato paste | 18 | 18 |
| Starch | 3 | 3 |
| Salt | 1 | 1 |
| Neohesperidin dihydrochalcone | — | 2 ppm |
| Water | to 100 ml | to 100 ml |

Comparisons of the standard and neohesperidin dihydrochalcone containing formulation by the expert panel yielded the following:

The sauce containing neohesperidin dihydrochalcone had a greater flavor impact and a riper tomato flavor. The general softening and rounding of the flavor profile resulted in a fuller mouthfeel and a cleaner mouthfeel.

EXAMPLE 8

Table-Top Sweetener Composition

Table-top sweetener formulations were prepared, one based solely on saccharin as the sweetener and one based solely on aspartame. The test formulations were also prepared containing neohesperidin dihydrochalcone. The benefits of using neohesperidin dihydrochalcone were then assessed in standard tea and coffee beverages by an expert panel.

| | Formulation PER TABLET | |
|---|---|---|
| | | Neohesperidin dihydrochalcone (ppm) |
| | Saccharin (mg) | |
| Standard | 16 | — |
| Test | 12 | 0.5 |
| | Aspartame (mg) | |
| Standard | 30 | — |
| Test | 20 | 0.5 |

Comparisons of the standard and test formulations yielded the following consensus opinions:

Hot beverages sweetened with a neohesperidin dihydrochalcone blend all had a greater flavor impact and a softer, more rounded sweetness profile. The drying aftertaste characteristic of the saccharin sweetened beverages was much reduced in the neohesperidin dihydrochalcone blend as was the lingering sweet aftertaste characteristic of the aspartame sweetened beverages when aspartame was blended with neohesperidin dihydrochalcone.

We claim:

1. A method of enhancing the body and mouthfeel properties of a food or beverage composition comprising incorporating an amount of from 0.1 to 4.0 ppm of neohesperidin dihydrochalcone to enhance said body and mouthfeel properties, in said food or beverage composition.

2. The method according to claim 1, wherein said amount of neohesperidin dihydrochalcone is from 0.1 to 3.0 ppm.

3. The method according to claim 1, wherein said amount of neohesperidin dihydrochalcone is from 0.1 to 2.0 ppm.

4. The method according to claim 1, wherein said amount of neohesperidin dihydrochalcone is from 0.1 to 1.0 ppm.

5. The method of according to claim 1, wherein said amount of neohesperidin dihydrochalcone is from 0.1 to 0.5 ppm.

* * * * *